ABSTRACT OF THE DISCLOSURE 3,522,292
PROPARGYLAMINOPHENYL CARBAMATES
AND RELATED COMPOUNDS
Erwin Nikles, Liestal, Switzerland, assignor to Ciba Limited, Basel, Switzerland, a company of Switzerland
No Drawing. Filed Aug. 20, 1968, Ser. No. 753,873
Claims priority, application Switzerland, Aug. 22, 1967, 11,773/67
Int. Cl. C07c 125/06
U.S. Cl. 260—479          11 Claims

ABSTRACT OF THE DISCLOSURE

The invention comprises new carbamates of formula

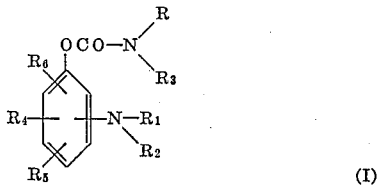

wherein $R_1$ represents an alkinyl radical having 3 to 6 carbon atoms and $R_2$ represents a lower alkyl, alkenyl or alkinyl radical, R, $R_3$, $R_4$, $R_5$ and $R_6$ are identical or different and represent hydrogen or lower alkyl radicals, especially the methyl radical, and their salts. The carbamates of Formula I are used in pesticidal preparations.

---

The present invention provides compounds of formula

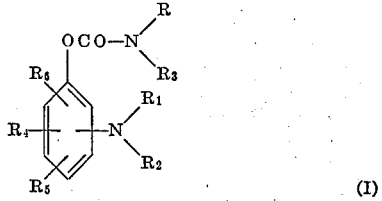

wherein $R_1$ represents an alkinyl radical having 3 to 6 carbon atoms and $R_2$ represents a lower alkyl, alkenyl or alkinyl radical, R, $R_3$, $R_4$, $R_5$ and $R_6$ are identical or different and represent hydrogen or lower alkyl radicals, especially the methyl radical, and their salts.

The present invention also provides a pesticidal preparation, which comprises a compound of the above mentioned general formula, together with a suitable carrier.

The preparations may contain one or more of the following additives: a solvent, a diluent, a dispersing agent, a wetting agent, an emulsifier and thickener, as well as further known pesticides, especially materials for combating harmful insects.

The new carbamates of Formula I show interesting biocidal properties. They are effective against fungi and bacteria, molluscs, nematodes, and especially against insects and pests of the order Acarina in all stages of development. The new materials are outstandingly suitable for combatting animal-parasite insects and Acarina, pests and carriers which transfer diseases, and material and storage pests. When used in plant protection, they are effective in combating insects on the cultures and in the soil, and acarides and nematodes.

It should be especially noted that the compounds and preparations of the invention possess favourable toxicities to warm-blooded animals.

Particularly interesting are preparations containing, as the active component, a carbamate of formula

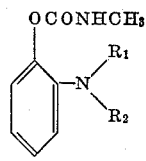

wherein $R_1$ represents an alkinyl residue having 3 to 6 carbon atoms and $R_2$ represents a lower alkyl, alkenyl or alkinyl residue, and their salts.

Within this class, the carbamates of formula

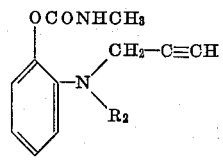

should be especially mentioned, wherein $R_2$ represents a lower alkyl or alkenyl radical or the propargyl radical, and their salts.

The following N-methylcarbamates may be mentioned as examples:

(1) 2-(n-propyl-propargyl-amino)-phenyl-N-methyl-carbamate;
(2) 2-(isopropyl-propargyl-amino)-phenyl-N-methyl-carbamate;
(3) 2-(allyl-propargyl-amino)-phenyl-N-methyl-carbamate;
(4) 2-(dipropargylamino)-phenyl-N-methylcarbamte;
(5) 2-(methallyl-propargyl-amino)-phenyl-N-methylcarbamate;
(6) o-(methyl-1-methyl-2-propinyl-amino)-phenyl-N-methylcarbamate;
(7) o-(1,1,N-trimethyl-2-propinyl-amino)-phenyl-N-methylcarbamate;
(8) o-(1-ethyl-1,N-dimethyl-2-propinylamino)-phenly-N-methyl-carbamate;
(9) o-(ethyl-1-methyl-2-propinylamino)-phenyl-N-methyl-carbamate;
(10) o-(1-ethyl-1,N-dimethyl-2-propinyl-amino)-phenyl-N-methylcarbamate;
(11) o-(2-butin-1-yl-methylamino)-phenyl-N-methylcarbamate;
(12) o-(ethyl-2-butin-1-yl-amino)-phenyl-N-methylcarbamate;
and especially
(13) 2-(methyl-propargyl-amino)-phenyl-N-methylcarbamate,
and (14) 2-(ethyl-propargyl-amino)-phenyl-N-methylcarbamate; as well as their salts, and amongst these particularly (15) the acid sulphate of compound (13); and (16) the acid sulphate of compound (14).

A special class consists of those compounds of general formula

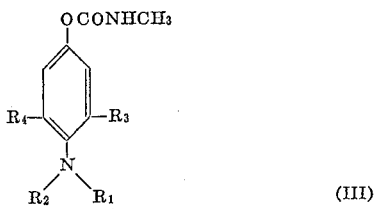

wherein $R_1$ represents a lower alkinyl radical having 3 to 6 carbon atoms, $R_2$ represents a lower alkyl, alkenyl or alkinyl radical, $R_3$ represents a lower alkyl radical and $R_4$ represents hydrogen or a lower alkyl radical.

Within this class, there should especially be emphasized those of general formula

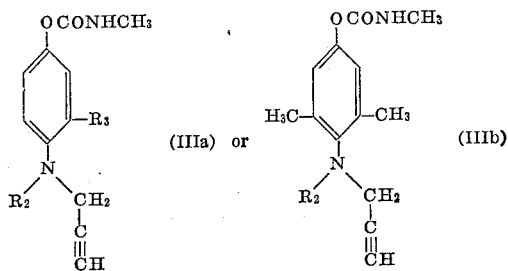

wherein $R_2$ represents a lower alkyl, alkenyl or the propargyl radical and $R_3$ represents a lower and optionally branched alkyl radical, or their salts.

The following N-methylcarbamates may be mentioned as especially active substances:

(17) 3,5-dimethyl-4-(methyl-propargyl-amino)-phenyl-N-methylcarbamate;
(18) 3,5-dimethyl-4-(ethyl-propargylamino)-phenyl-N-methylcarbamate;
(19) 3,5-dimethyl-4-(n-propylpropargyl-amino)-phenyl-N-methylcarbamate;
(20) 3,5-dimethyl-4-(isopropyl-propargyl-amino)-phenyl-N-methylcarbamate;
(21) 3,5-dimethyl-4-(allyl-propargyl-amino)-phenyl-N-methylcarbamate;
(22) 3,5-dimethyl-4-(dipropargylamino)-phenyl-N-methylcarbamate;
(23) 3,5-dimethyl-4-(n-butyl-propargyl-amino) phenyl-N-methylcarbamate;
(24) 3,5-dimethyl-4-(sec.butyl-propargyl-amino)-phenyl-N-methylcarbamate;
(25) 3,5-dimethyl-4-(isobutyl-propargyl-amino)phenyl-N-methylcarbamate;
(26) 3,5dimethyl-4-(N',1'-dimethyl-2'-propinyl-amino)-phenyl;
(27) 3,5-dimethyl-4-[bis(1'-methyl-2'-propinyl)amino]-phenyl-N-methylcarbamate;
(28) 3-methyl-4-(methyl-propargyl-amino)-phenyl N-methylcarbamate;
(29) 3-methyl-4-(n-propyl-propargyl-amino)-phenyl-N-methylcarbamate;
(30) 4-(isopropyl-propargyl-amino)-3-methyl-phenyl-N-methylcarbamate;
(31) 4-(N',1'-dimethyl-2'-propinyl-amino)-3-methylphenyl-N-methylcarbamate;
(32) 4[bis(1'-methyl-2'-propinyl)-amino]3-methyl-phenyl-N-methylcarbamate;
(33) 4-(allyl-propargyl-amino)-3-methyl-phenyl-N-methylcarbamate;
(34) 3-ethyl-4-(dipropargylamino)-phenyl-N-methylcarbamate;
(35) 4-dipropargyl-amino-3-isopropylphenyl-N-methylcarbamate;
(36) 3-isopropyl-4-(methyl-propargyl-amino)-phenyl-N-methyl-carbamate;
(37) 3-sec.butyl-4-(methyl-propargylamino)phenyl-N-methylcarbamate;
(38) 3-sec.butyl-4-(dipropargylamino)-phenyl-N-methylcarbamate;
(39) 3-(1'-ethylpropyl)-4-(methyl-propargyl-amino)-phenyl-N-methylcarbamate;
(40) 3-(1'-ethyl-propyl)-4-dipropargylamino-phenyl-N-methylcarbamate;
(41) 3-(1'-methylbutyl)-4-(methylpropargyl-amino)-phenyl-N-methylcarbamate;
(42) 4-dipropargyl-amino-3-(1'-methylbutyl)-phenyl-N-methylcarbamate;
(43) 3-tert.butyl-4-(methyl-propargyl-amino)-phenyl-N-methylcarbamate and
(44) 3-tert.butyl-4-(dipropargylamino)-phenyl-N-methylcarbamate.

All these compounds which have been mentioned show, by themselves or in the form of preparations, a high contact action and ingested poison action against hexapodes and arachnoids, above all against harmful Lipidoptera, Coleoptera, Hymenoptera, Rynchota and other orders of insects which are known as important pests in plant protection.

The outstanding action of the compounds of Formula I against pests and vermin in veterinary hygiene and in public hygiene should furthermore be stressed.

For example, 2-(methyl-propargyl-amino)-phenyl-N-methylcarbamate, 2 - (ethyl-propargyl-amino)-phenyl-N-methylcarbamate and 2-(dipropargylamino) - phenyl-N-methylcarbamate are highly active against cockroaches, for example, *Phyllodromia germanica*, *Periplaneta americana*, *Blatta orientalis*, against bugs, for example, *Cimex lectularius* mosquitoes, for example, *Aedes aegypti* or *Anopheles stephensi*, parasitary mites, for example, *Dermenyssus gallinae*, and ticks, for example, *Boophilus microplus* and *Amblyomma variegatum*. In the form of their salts, especially the acid sulphates, the preparations are suitable for use as the active component in bait mixtures for combating flies.

The active substances of general Formula III show, in addition to specific contact actions, very high ingested poison activities. Their special action spectrum makes them above all suitable for combating pests in the following cultures; cotton, rice, maize, soft fruit and hard fruit and lucerne. They are especially active against the Lepidoptera, Coleoptera, Rhynchota and Hymenoptera which are particularly dangerous to the above cultures. Purely by way of illustration, attention is drawn to the excellent action of 3,5-dimethyl-4-(dipropargylamino)-phenyl-N-methylcarbarate and of 3,5-dimethyl - 4 - (methylpropargyl-amino)-phenyl-N-methylcarbamate against noctuid larvae, for example *Prodenia litura* and *Prodenia ornithogalli* and proboscis-beetles,, for example, *Anthonomus grandis*, which occur on cotton and other cultures.

Amongst the active substances according to the invention, those of general Formula IV below are especially active:

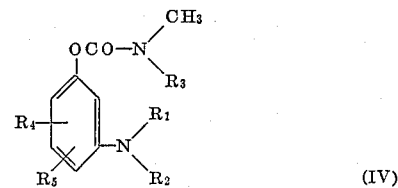

wherein $R_1$ represents a lower alkinyl radical having 3 to 6 carbon atoms and $R_2$ represents a lower alkyl, alkenyl or alkinyl radical, $R_3$ and $R_4$ represent hydrogen or a lower alkyl radical and $R_5$ represents hydrogen or a methyl radical, Of these active substances of Formula IV, the following show a particularly good biological action against all orders of hexapodes and against the order Acarina (ticks and mites) and also against nematodes, preferably plant-parasitary nematodes:

(45) 3-(methyl-propargyl-amino)-phenyl-N-methylcarbamate;
(46) 3-(ethyl-propargyl-amino)-phenyl-N-methylcarbamate;
(47) 3-(n-propyl-propargyl-amino)-phenyl-N-methylcarbamate;
(48) 3-(isopropyl-propargyl-amino)-phenyl-N-methylcarbamate;
(49) 3-(allyl-propargyl-amino)-phenyl-N-methylcarbamate;
(50) 3-(dipropargylamino)-phenyl-N-methylcarbamate;
(51) 3-(N,1'-dimethyl-2-propinyl-amino)-phenyl-N'-methylcarbamate;
(52) 3-(N,1',1'-trimethyl-2'-propinyl-amino)-phenyl-N'-methylcarbamate;
(53) 3-(2-butinyl-methyl-amino)-phenyl-N-methylcarbamate;
(54) 2-methyl-4-dipropargylamino-5-isopropyl-phenyl-N-methylcarbamate;
(55) 2,3-dimethyl-4-dipropargylaminophenyl-N-methylcarbamate;
(56) 2,5-dimethyl-4-dipropargylamino-phenyl-N-methylcarbamate;
(57) 4-dipropargylamino-2-isopropyl-phenyl-N-methylcarbamate;
(58) 2,3,5-trimethyl-4-dipropargylamino-phenyl-N-methylcarbamate;
(59) 3-ethyl-4-dipropargylamino-5-methyl-phenyl-N-methylcarbamate;
(60) 4-dipropargylamino-3-isopropyl-5-methyl-phenyl-N-methylcarbamate;
(61) 3-dipropargylamino-4-methyl-phenyl-N-methylcarbamate;
(62) 4-methyl-3-(methyl-propargylamino)-phenyl-N-methylcarbamate;
(63) 4-dipropargylamino-2-isopropyl-5-methyl phenyl-N-methylcarbamate;
(64) 2-(methyl-propargyl-amino)-phenyl-N,N-dimethylcarbamate;
(65) 2-(dipropargylamino)-phenyl-N,N-dimethylcarbamate;
(66) 3-(dipropargylamino)-phenyl-N,N-dimethylcarbamate;
(67) 2-(dipropargylamino)-5-methyl-phenyl-N-methylcarbamate;
(68) 3-methyl-4-(dipropargylamino)-N-methylcarbamate and
(69) 2-(ethyl-propargylamino)-phenyl-N,N-dimethylcarbamate.

As has been mentioned, the active substances according to the invention can also be used in the form of their salts, for example, neutral and acid sulphates, phosphates, arsenates, iodates, hydrochlorides and nitrates, or also as salts of organic acids, for example, benzenesulphonic acid, p-toluenesulphonic acid, naphthalenesulphonic acid, methanesulphonic acid and trichloracetic acid.

The acid sulphates are preferred since these exhibit exceptional stability, for example, against hydrolytic influences.

The new carbamates can be manufactured by the methods which are usually used for the manufacture of this class of substances, for example, by reaction of corresponding phenols with methylisocyanate or methylalkylcarbamic acid chlorides, or by reaction of appropriately substituted aminophenylcarbonates or aminophenylchlorocarbonates with dialkylamines or alkylamines, for example, with methylamine or with methylalkylamine.

The residues $R_1$ and $R_2$ are preferably introduced into the intermediate products, that is the aminophenols, with the aid of reactive derivatives of the alcohols on which $R_1$ and $R_2$ are based. Post-alkylations of the amino group with alkylating reagents are also possible after formation of the carbamate grouping. Double and triple bonds in the residues $R_1$ and $R_2$ can furthermore be produced subsequently, for example, by splitting off halogen.

Substances that may be used for the manufacture of directly sprayable solutions of the compounds of general Formula I, are, for example, mineral oil fractions of high to medium boiling range, for example, diesel oil or kerosene, coal tar oil and oils of vegetable or animal origin, as well as hydrocarbons, for example, alkylated naphthalenes, and tetrahydronaphthalene, optionally using xylene mixtures, cyclohexanols, or ketones, and furthermore chlorinated hydrocarbons, for example, trichlorethane and tetrachlorethane, trichlorethylene or trichlorobenzenes and tetrachlorobenzenes. Organic solvents having a boiling point above 100° C. are advantageously used.

It is especially advantageous to prepare aqueous application forms from emulsion concentrates, pastes, wettable spraying powders or salts of the active substances by adding water. Examples of emulsifiers and dispersing agents that may be used are non-ionic products, for example, condensation products of aliphatic alcohols, amines or carboxylic acids having a long-chain hydrocarbon residue of about 10 to 20 carbon atoms, with ethylene oxide, for example, the condensation product of octadecyl alcohol and 25 to 30 mols of ethylene oxide, or that of technical oleylamine and 15 mols of ethylene oxide or that of dodecylmercaptan and 12 mols of ethylene oxide. Amongst the anionic emulsifiers which may be employed there may be mentioned: the sodium salt of dodecyl alcohol sulphuric acid ester, the sodium salt of dodecylbenzenesulphonic acid, the potassium or the triethanolamine salt of oleic acid or of abietic acid or of mixtures of these acids, or the sodium salt of a petroleum-sulphonic acid. Suitable cationic dispersing agents are quaternary ammonium compounds, for example, cetylpyridinium bromide or dihydroxyethylbenzyldodecylammonium chloride.

In order to manufacture dusting and scattering agents, talc, kaolin, bentonite, calcium carbonate, calcium phosphate, also charcoal, cork powder, wood flour and other materials of vegetable origin may be employed as solid carriers. It is also advantageous to manufacture the preparations in a granular form. The various use forms may in the usual manner be provided with the addition of substances which improve the distribution, adhesion, rain resistance or penetrating power; fatty acids, resin, glue, casein or alginates may be mentioned as such substances.

The compounds or preparations according to the invention may be used by themselves or together with conventional pesticides especially insecticides, acaricides, nematocides, bactericides or fungicides.

The following examples illustrate the invention, the parts being by weight.

EXAMPLE 1

(A) 2-(methyl-propargyl-amino)-phenol

A mixture of 36.9 parts of 2-methylamino-phenol, 40 parts of sodium bicarbonate and 200 parts by volume of dimethylsulphoxide is treated with 36 parts of propargyl bromide, added drop by drop, whilst stirring during which treatment the temperature rises to about 40° C. The suspension is stirred for 14 hours at 50° C., and is then diluted with 1000 parts of water. The product is extracted with toluene. The toluene solution is shaken with twice 200 parts by volume of 2 N sodium hydroxide solution under a nitrogen atmosphere. The aqueous extract is neutralised to a pH value of 7–8 and again extracted with toluene. The organic phase is dried over anhydrous sodium sulphate, filtered and evaporated. The residue is distilled in a high vacuum. Boiling point 89–90° C./0.15 mm. Hg. The product crystallises. Melting point 48–51° C.

(B) 2-(methyl-propargyl-amino)-phenyl-N-methylcarbamate 19 parts of 2-(methyl-propargyl-amino)-phenol and 0.1 part of triethylene diamine are dissolved in 150 parts by volume of dry toluene, and a total of 7.3 parts of methylisocyanate is added drop by drop. The temperature of the solution rises to 35° C. The solution is kept for 14 hours at this temperature, and is then evaporated in vacuo. The residue is crystallised from isopropanol. Melting point 92–94° C. Toxicity to rats (oral) $LD_{50}$: 75 mg./kg.

(C) Salts 8.7 parts of 2-(methyl-propargyl-amino)-phenyl-N-methyl-carbamate are dissolved in 60 parts by volume of dry dioxane and treated with 5.3 parts of concentrated sulphuric acid in 50 parts by volume of dioxane, added drop by drop.

The resulting sulphate is precipitated by dilution with 100 parts by volume of dry ether. The solvent mixture is decanted, and the residue is dried in a high vacuum. The product forms an amorphous tough mass. Toxicity to rats (oral) $LD_{50}$: 85 mg./kg.

34.6 parts of 2-(methyl-propargyl-amino)-phenyl-N-methyl-carbamate are introduced at 20° C. into dilute sulphuric acid (16.25 parts of 94.7% strength acid+49.15 parts of water) whilst cooling. A clear 50% strength aqueous solution of the acid sulphate is obtained.

Other salts, for example, the hydrochloride, nitrate, phosphate, p-toluenesulphonate and trichloroacetate, or their aqueous solutions, can also be manufactured in a similar manner.

EXAMPLE 2

(A) 2-(ethyl-propargyl-amino)-phenol 90.5 parts of propargyl bromide are added drop by drop, whilst stirring, to a mixture of 95.5 parts of 2-ethylaminophenol, 160 parts of calcined powdered soda and 1000 parts by volume of dimethylsulphoxide, whereupon the temperature rises. Thereafter, the mixture is stirred for a further day at 70° C., and is then poured onto 3000 parts of ice/water. The product is extracted with toluene. The toluene solution is dried over anhydrous sodium sulphate, filtered and evaporated. The residue is distilled in a high vacuum. Boiling point 76° C./0.02 mm. Hg.

(B) 2-(ethyl-propargyl-amino)-phenyl-N-methylcarbamate 49 parts of 2-(ethyl-propargyl-amino)-phenol and 0.3 part of triethylene diamine are dissolved in 200 parts by volume of dry toluene and reacted with 17.8 parts of methylisocyanate at 35° C. After 14 hours, the oily product is obtained by evaporation of the solution.

NMR-spectrum: δ-values [$CCl_4$/TMS]. $t=1.08$ ($J=7$) (3 H) (>N—$CH_2$—$CH_3$; $t=2.20$ ($J=2.4$) (1 H) (—C≡CH); $d=2.79$ ($J=5$) (3 H)

(—CO—NH—$CH_3$)

$q=3.16$ ($J=7$) (2 H) (>N—$CH_2$—$CH_3$); $d=3.82$ ($J=2.4$) (2 H) (>N—$CH_2$—C≡CH); $b=$approx. 5.3 (1 H) (—CO—NH—$CH_3$); $m=6.9$–$7.4$ (4 H)

(Ar—H)

EXAMPLE 3

(A) 2-isopropylamino-phenol

A mixture of 452 parts of 2-aminophenol, 600 parts of calcined soda, 492 parts of isopropylbromide and 100 parts by volume of dimethylsulphoxide is stirred for 20 hours at 85° C. After dilution with 4000 parts of water, the product is extracted with toluene. The toluene solution is evaporated and the residue is crystallised from ethyl acetate-petroleum ether. Melting point 98–99° C. Yield 330 parts.

(B) 2-(isopropyl-propargyl-amino)-phenol 75.5 parts of 2-isopropylamino-phenol and 37.2 parts of propargyl chloride are dissolved in 150 parts by volume of dimethylsulphoxide. The solution is stirred for 22 hours at 80° C. in the presence of 16 parts of calcined soda, and is then worked up as described under (A). Boiling point 60° C./0.01 mm. Hg.

(C) 2-(isopropyl-propargyl-amino)-phenyl-N-methyl-carbamate 27 parts of 2-(isopropyl-propargyl-amino)-phenol are dissolved in 150 parts by volume of dry toluene and reacted with 10 parts of methylisocyanate in the presence of 0.3 part of triethylene diamine during 18 hours at 35° C. The solution is evaporated, and the residue is crystallised once from toluene-hexane. Melting point 96–98° C.

EXAMPLE 4

(A) 2-propargylamino-phenol

A solution of 405 parts of 2-benzoxazolone in 2500 parts by volume of 5.3% strength sodium hydroxide solution is treated with 246 parts of propargyl chloride and warmed to 60° C. 1 part of cuprous chloride is then added whilst stirring, whereupon a weakly exothermic reaction occurs. The mixture is stirred for a further 14 hours at room temperature, cooled to +5° C., mixed with 100 parts by volume of 40% strength sodium hydroxide solution and filtered. The 1-propargyl-2-benzoxazolone, which is filtered off, is suspended in 2000 parts of water and mixed with 400 parts of sodium hydroxide in a nitrogen atmosphere whilst stirring, during which the temperature rises to 70° C. After cooling, the mixture is filtered and the clear solution is adjusted to pH=7 with concentrated hydrochloric acid. The product is filtered off, dried and crystallised once from toluene. Melting point 97–98° C.

(B) 2-(allyl-propargyl-amino)-phenol 43 parts of alyl chloride are added drop by drop whilst stirring to a mixture of 73.5 parts of 2-propargylaminophenol, 20 parts of potassium iodide and 59 parts of 2,6-lutidine in a nitrogen atmosphere, and at an initial temperature of 60° C. The temperature rises to 86° C. After 1½ hours reaction at 60° C., the oily product is obtained by pouring into water, extracting with toluene and evaporating the toluene solution.

(C) 2-(allyl-propargyl-amino)-phenyl-N-methyl-carbamate 87 parts of 2-(allyl-propargy-amino)-phenol are dissolved in 300 parts by volume of carbon tetrachloride and reacted with 30 parts of methylisocyanate in the presence of 0.2 part of diethylene triamine at 35° C. After 14 hours reaction, the oily product is obtained by evaporating the solution.

NMR - spectrum: δ - values [$CCl_4$/TMS]. $t=2.25$ ($J=2.4$) (1 H) (>N—$CH_2$—C≡CH); $d=2.84$ ($J=5$) (3 H) (—CO—NH$CH_3$); $d=3.67$ ($J=2.4$) (2 H) (>N—$CH_2$—C≡CH);  $m=3.55$–$3.9$ (>N—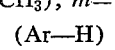—CH=$CH_2$)

$m=5$–$6.2$ (>N—$CH_2$—CH=$CH_2$) (—NHCH$_3$);

$m=6.7$–$7.4$ (Ar—H)

EXAMPLE 5

(A) 2-(dipropargylamino)-phenol 54.5 parts of 2-aminophenol are dissolved in 500 parts by volume of dimethylsulphoxide. The solution is treated with 250 parts of powdered sodium bicarbonate and then with 199 parts of propargyl bromide, which is added drop by drop. The temperature is allowed to rise to 50°

C., and after completion of the addition, the mixture is stirred for a further 14 hours at this temperature.

The mixture is poured into 1500 parts by volume of water, and is extracted with 500 parts by volume of toluene. The extract is purified by washing the strongly alkaline aqueous solution and, after treatment with hydrochloric acid, by washing the acidified aqueous solution in the usual manner. The product is crystallised from hexanecarbon tetrachloride (1:4). Melting point 47–49° C.

(B) 2-(dipropargylamino)-phenyl-N-methylcarbamate 30 parts of 2-(dipropargylamino)-phenol are dissolved in 150 parts by volume of dry toluene and 0.2 part of triethylene diamine are added.

The solution is treated with 10 parts of methylisocyanate added in portions, and is then kept for 14 hours at a temperature of 30–35° C. The product is obtained by evaporating the solution in vacuo. Melting point, after crystallising once from carbon tetrachloride, 90–91° C. Toxicity to rats (oral) $LD_{50}$: 120 mg./kg.

EXAMPLE 6

(A) o-(N,1-dimethyl-2-propinyl-amino)-phenol

A solution of 49 parts of o-methylamino-phenol in 50 parts of dimethylformanide and 47 parts of 2,6-lutidine is treated with 17 parts of potassium iodide and, at 60° C., with 100 parts of the p-toluenesulphonic acid ester of 1-methyl-2-propin-1-ol dissolved in 80 parts by volume of dimethylformamide and added in portions. The mixture is stirred for 4 hours at 90° C., cooled, and diluted with about 600 parts of water. The oily product is obtained by extraction with toluene.

(B) o-(N′,1-dimethyl-2-propinyl-amino)-phenyl-N-methylcarbamate 63 parts of o-(methyl-1-methyl-2-propinyl-amino)-phenol in 100 parts by volume of carbon tetrachloride are reacted at 35° C. in the presence of 0.2 part of triethylene diamine, with 23 parts of methylisocyanate. After 14 hours, the solution is evaporated and the residue is crystallised from methanol-water and from toluene-hexane. Melting point 77–79° C.

EXAMPLE 7

2-(ethyl-propargyl-amino)-phenyl-N,N-dimethylcarbamate

A mixture of 40 parts of 2-(ethyl-propargyl-amino)-phenol, 200 parts by volume of dry dioxan, 26 parts of triethylamine and 28 parts of dimethylcarbamic acid chloride is kept for 20 hours at 90° C. The triethylamine hydrochloride which has separated out is filtered off and the filtrate is evaporated. The residue is dissolved in toluene and, whilst cooled in ice, is washed 4 times with 200 parts by volume of 2 N sodium hydroxide solution and then with water. The solution is evaporated and the residue distilled in a high vacuum. Boiling point 105° C./0.01 mm. Hg.

The following compounds may be manufactured similarly to the procedure described in Examples 1 to 7.

EXAMPLE 8

3-(isopropylamino)-phenol, melting point 98–100° C. (toluene-cyclohexane), from 3-aminophenol and isopropyl bromide. 3-(isopropylpropargyl-amino)-phenol, oily crude product, directly used for the manufacture of 3 - (isopropyl - propargyl-amino)-phenyl-N-methylcarbamate. Melting point 75–78° C. (toluene-hexane).

EXAMPLE 9

3-(dipropargylamino)-phenol, melting point 101–102° C. (crystallises from benzene together with solvent). 3-(dipropargylamino)-phenyl-N-methylcarbamate, melting point 88–90° C. (toluene).

EXAMPLE 10

2-(dipropargylamino)-5-methyl-phenol, boiling point 119° C./0.08 mm. Hg. 2-(dipropargylamino)-5-methyl-phenyl-N-methylcarbamate, melting point 102–104° C. (toluene).

EXAMPLE 11

4-(dipropargylamino)-3-methyl-phenol, boiling point 140° C./0.05 mm. Hg. 4-(dipropargylamino)-3-methyl-phenyl-N-methylcarbamate, melting point 85–87° C. (toluene-cyclohexane). Toxicity to rats (oral) $LD_{50}$: 146 mg./kg.

EXAMPLE 12

3,5 - dimethyl - 4 - (dipropargylamino)-phenol, boiling point 116–117° C. /0.06 mm. Hg. 3,5-dimethyl-4-(dipropargylamino)-phenyl-N-methylcarbamate, melting point 87–88° C. (methanol-water). Toxicity to rats (oral) $LD_{50}$: 200 mg./kg.

EXAMPLE 13

3,5-dimethyl-4-(methyl-propargyl-amino)-phenol, from 3,5-dimethyl-4-methylamino-phenol and propargyl chloride; oily crude product, directly used for the manufacture of 3,5 - dimethyl-4-(methyl-propargyl-amino)-phenyl-N-methylcarbamate, melting point 64–66° C. (toluene-cyclohexane).

EXAMPLE 14

3,5-dimethyl-4-isopropylamino-phenol, from 4-amino-3,5-dimethylphenol and isopropyl bromide, melting point 106–110° C. (toluene). 3,5-dimethyl-4-(isopropyl-propargyl-amino)-phenol, crude product directly used for the manufacture of 3,5 - dimethyl - 4 - (isopropyl-propargyl-amino)-phenyl-N-methylcarbamate, melting point 87° C. after crystallising once from methanol-water.

EXAMPLE 15 o-(2-propinyl-N,1,1-trimethyl-amino)-phenol from o-methyl-amino-phenol and 1-chloro-1,1-dimethyl-2-propine according to Example 6, using cuprous chloride as the catalyst, oily crude product, directly used for the manufacture of o-(2-propinyl-N,1,1-trimethyl-amino)-phenyl-N-methylcarbamate.

All the active substances described in Examples 2 to 15 can be converted into the sulphates and other salts as described under Example 1(C).

EXAMPLE 16

Dusting agents

Equal parts of an active substance according to Examples 1–15 are mixed with precipitated silica, and finely ground. Dusting agents having the desired concentration of active substance can be manufactured therefrom by mixing with kaolin or talc. In general, preparations containing 1–5% of active substance are preferred.

Spraying powders

In order to manufacture a spraying powder, the following components are, for example, mixed and finely ground: 50 parts of active substance according to Examples 1–15, 20 parts of Hisil (highly adsorbent silica), 25 parts of bolus (kaolin), 3.5 parts of the reaction product of p-tert. octylphenol and ethylene oxide, and 1.5 parts of (sodium 1-benzyl-2-stearyl-benzimidazole-6,3′-disulphonate).

Emulsion concentrate

Easily soluble active substances can also be formulated, as an emulsion concentrate, according to the following instruction: 20 parts of active substance, 70 parts of xylene and 10 parts of a mixture of a reaction product of an alkylphenol with ethylene oxide and calcium dodecylbenzenesulphonate are mixed. On dilution with water to the desired concentration, a sprayable emulsion is produced.

EXAMPLE 17

Dusting agents based on talc, manufactured according to Example 16, are tested against storage pests and domestic hygiene pests, using the following compounds:

| Types of test animal | Minimum concentration for 100% deaths in 24 hours exposure time (mg. of active substance per m.²) Compound Number | | | | |
|---|---|---|---|---|---|
| | 13 | 15 | 4 | 2 | 14 |
| German cockroach (*Phyllodromia germanica*) | 3 | 12 | 6 | 12 | 25 |
| American cockroach (*Periplaneta americana*) | 3 | 6 | 0.8 | 3 | 3 |
| Russian cockroach (*Blatta orientalis*) | 12 | 6 | 12 | 12 | 12 |
| Meal beetle imago (*Tenebrio molitor*) | 50 | >200 | >200 | 100 | 100 |
| Larva | 50 | >200 | 100 | 200 | >200 |
| imago (*Dermestes frischii*) | 50 | >200 | >200 | 25 | 50 |
| Larva | 25 | 25 | 12 | 12 | 25 |
| larva (*Attagenus piceus*) | 50 | 50 | 100 | >200 | >200 |
| House cricket (*Acheta domestica*) | 25 | 12 | 12 | 12 | 12 |

EXAMPLE 18

Action against female mosquitoes (*Aedes aegypti*)

Female mosquitoes are exposed for 6 hours to a coating of the test substance in Petri dishes of 11 cm. diameter. In order to manufacture this coating, an acetone solution of the substance is manufactured. The bottom part of the dish is treated with 1 ml. of the solution and dried for 1 hour. Concentrations of 1000, 100, 10 and 1 p.p.m. are used. This corresponds to a use quantity of 1, 0.1, 0.01 and 0.001 mg./dish.

The mosquitoes are cooled in ice and counted into the dishes, using 10 females for each, 4 repeats are run for each concentration.

Using an amount of 0.001 mg./dish, the following percentage mortalities were found for 4 active substances after two independently measured time intervals:

| Compound Number | After 45 minutes, percent | After 90 minutes, percent |
|---|---|---|
| 4 | 75 | 100 |
| 13 | 100 | 100 |
| 14 | 100 | 100 |
| 15 | 100 | 100 |

EXAMPLE 19

Action against ticks (*Rhipicephalus bursa*)

10 ticks are dipped for 1 minute into various concentrations of the emulsified active substance in a test tube and are kept for 14 days after removing the liquid by suction. 100% mortality was ascertained at the following concentrations of 10 to 100 p.p.m.

| Compound No.: | Concentration in p.p.m. |
|---|---|
| 4 | 100 |
| 13 | 10 |
| 14 | 10 |
| 15 | 10 |

EXAMPLE 20

Larvae test with *Orgyia gonostigma* and *Epilachna varivestis*

Potted young mallow plants (*Malva sylvestris*) having about 6 leaves are dipped into an active substance solution of a particular concentration and allowed to dry. Thereafter a cellophane hood with 5 larvae of *Orgyia gonostigma* in the $L_3$-stage is put over each plant and fixed with a rubber band. The insecticidal ingestion action and contact action is examined 2 and 5 days later. If 100% mortality is found the first time, the plant is infested afresh so that in this case the possible ageing of the active substance is at the same time included in the test.

A similar test is carried out with the Mexican bean beetle (*Epilachna varivestis*) in the $L_4$-larvae stage, using Phaseolus at the host plant.

The following results were obtained with an appropriate dilution series of an active substance:

| Compound number | Concentration in p.p.m. | Larva | Percentages killed after— | |
|---|---|---|---|---|
| | | | 2 days | 5 days |
| 22 | 800 | Orgyia | 100 | 100 |
| | 400 | | 100 | 100 |
| | 200 | | 100 | 80 |
| | 100 | | 60 | 80 |
| 4 | 800 | Epilachna | 60 | 100 |
| | 400 | | 60 | 100 |
| | 200 | | 0 | 100 |
| | 100 | | 0 | 100 |
| | 50 | | 0 | 100 |

EXAMPLE 21

Action against *Aphis fabae* (contact action and prolonged action)

Young *Vicia faba* plants of about 6 cm. height are infested with parts of plants which have been attacked by *Aphis fabae*. After 5 days the starting conditions for testing the active substance exist as a result of further growth of the plant and appropriately great increase in the number of the aphids. For the *contact test*, the attacked plant is sprayed from all sides with a chromatography atomiser containing a certain concentration of active substance, beginning at 800 p.p.m. The action is ascertained after 2 and 5 days. If 100% mortality is found after 2 days, the plant in question is re-infested.

The following result was obtained with a dilution series of compound No. 13:

| Concentration in p.p.m. | Percentages killed after— | |
|---|---|---|
| | 2 days | 5 days |
| 800 | 100 | 100 |
| 400 | 100 | 100 |
| 200 | 100 | 100 |
| 100 | 100 | 60 |

EXAMPLE 22

Action against pests in fruit culture (A) Young apple trees showing normal attack by pests are sprayed some days before flowering ($E_2$ stage) with appropriately diluted solutions of active substance. After an average of 4 to 10 days 200 blossoms per tree are selected and the number of dead individuals on these is counted. The activity is ascertained by comparison with the number of living pests on untreated trees. The following results, obtained at the end of April to beginning of May, are presented in the table, in which the first species belong to the order Rhynchota and the remainder to the order Lepidoptera.

| Compound Number | Concentration of active substance, p.p.m. | Psylla mali action after 5 days, Percent | Cheimatobia brumata L. action after 9 days, Percent | Spilonota ocellana action after 7 days, Percent | Hyponomeuta malinellus Zell. action after 8 days, Percent |
|---|---|---|---|---|---|
| 4 | 400 | 93 | 95 | 81 | 96 |
| 13 | 400 | 100 | 96 | 93 | 97 |
| 22 | 400 | 99 | 93 | 95 | 84 |
| 68 | 400 | 99 | 98 | 90 | 77 |
| Untreated control | | 5 | 22 | 10 | 8 |

(B) In a special test of the effect against *Cheimatobia brumata* L. larvae 3 groups at a time were chosen for 3 artificially infested apple trees at a time. After the larvae were half-developed, sprayings with concentrations of 400 p.p.m. of active substance were effected. After 6 days the result was evaluated as described under (A), with the following percentage mortalities being found.

Compound No.:     Mortality, percent
4 ---------------------------------------- 99
13 --------------------------------------- 100
22 --------------------------------------- 98
68 --------------------------------------- 99

(C) Contact test: In 3 parallel determinations, 10 larvae at a time of *Aporia crataegi* (Lepidoptera, Pieridae) in the L₃-stage to L₄-stage are dipped into an aqueous solution containing 400 p.p.m. of active substance and introduced into glass vessels together with fresh leaves of plum trees (Prunus) as food.

After the times specified, the following percentage mortalities were found:

| Compound Number | Mortality (percent) after— | | |
|---|---|---|---|
| | 6 hours | 24 hours | 48 hours |
| 4 | 23 | 83 | 100 |
| 13 | 83 | 100 | |
| 22 | 30 | 100 | |
| 68 | 0 | 80 | 100 |

EXAMPLE 23

Action against pests in alfalfa cultures (A) Contact test: In 3 parallel determinations, 10 adults at a time of *Phytodecta fornicata Brüggem.* (Coleoptera, Chrysomelidae) were briefly dipped into an aqueous solution containing 400 p.p.m. of active substance and placed on fresh food (alfalfa).

After the times specified, the following percentage mortalities were found:

| Compound Number | Mortality (percent) after— | |
|---|---|---|
| | 6 hours | 24 hours |
| 4 | 100 | |
| 13 | 100 | |
| 22 | 100 | |
| 68 | 93 | 100 |

(B) Ingestion test: In 2 parallel determinations, 10 adults at a time of *Hypera variabilis* Herbst (Coleoptera) ("alfalfa weevil") are placed on leaves or shoots of alfalfa plants which have beforehand been treated with aqueous solutions of active substance (400 p.p.m. of active substance).

After the times specified, the following percentage mortalities were found:

| Compound Number | Mortality (percent) after— | | |
|---|---|---|---|
| | 6 hours | 24 hours | 48 hours |
| 4 | 0 | 80 | 100 |
| 13 | 20 | 80 | 100 |
| 22 | 70 | 100 | |
| 68 | 15 | 35 | 100 |

EXAMPLE 24

Action against cotton pests (A) In 4 parallel experiments, cotton leaves are dipped into aqueous solutions containing 500 p.p.m. of active substance, allowed to dry in the air and introduced into glass vessels into which are placed 5 larvae at a time of *Prodenia ornithogalli* ("yellow-striped army-worm larvae") in the L₃-stage.

The compound No. 22 resulted in 100% mortality after 48 hours.

(B) *Prodenia litura* larvae in the L₂-stage are introduced, five at a time, together with a leaf of *Malva silvestris* which has been dipped as in Example 20, into a covered Petri dish the atmosphere moisture of which is maintained with a moistened cotton wool swap. In this contact and ingestion test the action is examined after 1 and 2 days, with a fresh infestation being effected after 1 day in all cases.

The following result was obtained with a dilution series of compound No. 22:

| Concentration in p.p.m. | Percentage mortalities after— | |
|---|---|---|
| | 1 day | 2 days |
| 800 | 100 | 100 |
| 400 | 80 | 100 |
| 200 | 100 | 100 |
| 100 | 100 | 100 |
| 50 | 80 | 60 |

(C) Potted young cotton plants in the 7-leaf stage are dipped into an aqueous solution containing 200 p.p.m. of active substance in such a way that the surface of the soil, which is additionally protected by a lid, does not come into contact with the solution of the active substance. After drying, 5 individuals of *Anthonomus grandis* ("boll weevil") are placed on each plant.

After the stated times, the following percentage mortalities were found in 5 parallel experiments at a time:

| Compound Number | Mortality (percent) after— | |
|---|---|---|
| | 2 days | 5 days |
| 4 | 80 | 95 |
| 13 | 65 | 95 |
| 22 | 95 | 100 |

EXAMPLE 25

Action against soil insects

Larvae of *Diabrotica balteata* ("banded cucumber beetle") (4–7 days old) are introduced into cabinets containing a 10 cm. layer of moist soil which was treated with an aqueous solution of active substance so that a use quantity of 2.5 kg. of active substance/ha. was calculated to be provided.

After 7 days compounds No. 2 and 14 had achieved 100% mortality.

EXAMPLE 26

Action against *Melolontha melolontha* L.

(A) Ingestion action: Fresh beech leaves are sprayed with an aqueous solution containing 200 p.p.m. of active substance and after drying the surface are introduced together with 5 adult male may-beetles at a time into a crystallising dish having a 3 cm. high rim and a 10 cm. diameter, the dish being covered with a gauze lid.

After the stated times, the following percentage mortalities were found in 6 parallel experiments at a time:

| Compound Number | Mortality (percent) after hours— | | | | |
|---|---|---|---|---|---|
| | 2 | 4 | 8 | 24 | 48 |
| 4 | 10 | 23 | 53 | 100 | |
| 13 | 37 | 70 | 90 | 90 | 100 |
| 22 | 33 | 67 | 80 | 100 | |
| 68 | 30 | 60 | 70 | 97 | 100 |

(B) Contact action: 5 adult male may-beetles at a time, which were briefly dipped into an aqueous solution containing 200 p.p.m. of active substance, are introduced into a crystallising dish together with fresh untreated beech leaves, in the manner described under (A).

After the stated times, the following percentage mortalities were found in 6 parallel experiments at a time:

| Compound Number | Mortality (percent) after hours— | | | | |
|---|---|---|---|---|---|
| | 2 | 4 | 8 | 24 | 48 |
| 4 | 13 | 23 | 27 | 60 | 90 |
| 13 | 57 | 100 | | | |
| 22 | 33 | 57 | 73 | 100 | |
| 68 | 23 | 37 | 37 | 63 | 73 |

Similar biological actions to those described in Examples 17 to 26 were shown by the remainder of the active compounds numbered from 1–69.

What is claimed is:

1. Carbamates of the general formula

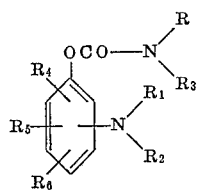

wherein $R_1$ represents an alkinyl radical having 3 to 6 carbon atoms and $R_2$ a lower alkyl, alkenyl or alkinyl radical, the unsaturation in the $R_1$ and $R_2$ groups being between carbon atoms 2 and 3, and R, $R_3$, $R_4$, $R_5$ may be identical or different and represent hydrogen or lower alkyl radicals, $R_6$ represents hydrogen, and their neutral or acid salts.

2. Carbamates as claimed in claim 1 of the formula

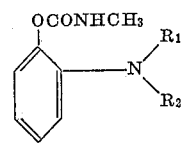

wherein $R_1$ represents an alkinyl radical having 3 to 6 carbon atoms and $R_2$ represents a lower alkyl, alkenyl or alkinyl radical, the unsaturation in the $R_1$ and $R_2$ groups being between carbon atoms 2 and 3 and their neutral or acid salts.

3. Carbamates as claimed in claim 1 of the formula

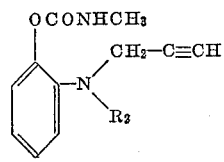

wherein $R_2$ represents a lower alkyl or alkenyl radical with the unsaturation being between carbon atoms 2 and 3, or the propargyl radical, and their neutral or acid salts.

4. Carbamates as claimed in claim 1 of the formula

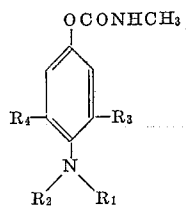

wherein $R_1$ represents a lower alkinyl radical having 3 to 6 carbon atoms, $R_2$ represents a lower alkyl, alkenyl or alkinyl radical, the unsaturation in the $R_1$ and $R_2$ groups being between carbon atoms 2 and 3, $R_3$ represents a lower alkyl radical and $R_4$ represents hydrogen or a lower alkyl radical, as well as their neutral or acid salts.

5. Carbamates as claimed in claim 1 of the formula

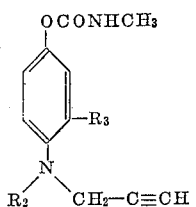

wherein $R_2$ represents a lower alkyl or alkenyl radical with the unsaturation being between carbon atoms 2 and 3, or the propargyl radical and $R_3$ represents a lower and optionally branched alkyl radical, and their neutral or acid salts.

6. Carbamates as claimed in claim 1 of the formula

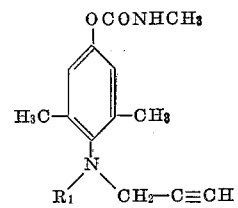

wherein $R_2$ represents a lower alkyl or alkenyl radical with the unsaturation being between carbon atoms 2 and 3, or the propargyl radical, and $R_3$ represents a lower and optionally branched alkyl radical, and their neutral or acid salts.

7. Carbamates as claimed in claim 1 of the formula

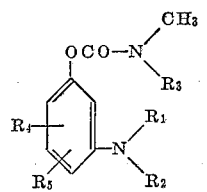

as the free base or in the form of a neutral or acid salt, wherein $R_1$ represents a lower alkinyl radical having 3 to 6 carbon atoms and $R_2$ represents a lower alkyl, alkenyl or alkinyl radical, the unsaturation in the $R_1$ and $R_2$ groups being between carbon atoms 2 and 3, $R_3$ and $R_4$ represent hydrogen or a lower alkyl radical and $R_5$ represents hydrogen or the methyl group.

8. A carbamate as claimed in claim 1 of the formula

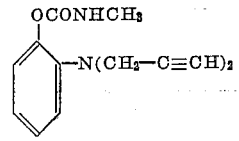

as the free base or as the acid sulphate.

9. A carbamate as claimed in claim 1 of the formula
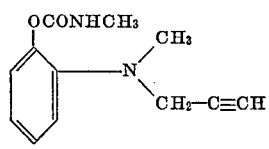
as the free base or as the acid sulphate.
10. A carbamate as claimed in claim 1 of the formula
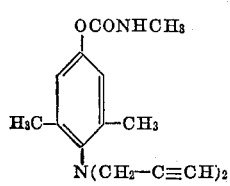
as the free base or as the acid sulphate.
11. A carbamate as claimed in claim 1 of the formula
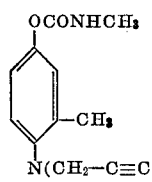
as the free base or as the acid sulphate.
References Cited
UNITED STATES PATENTS
2,776,197   1/1957   Gysin et al. _____ 260—479
JAMES A. PATTEN, Primary Examiner
U.S. Cl. X.R.
260—574, 571, 307; 424—199, 297, 300